United States Patent [19]
Kull

[11] Patent Number: 6,163,089
[45] Date of Patent: Dec. 19, 2000

[54] RAILWAY LOCOMOTIVE ECP TRAIN LINE CONTROL

[75] Inventor: Robert C. Kull, Olney, Md.

[73] Assignee: Westinghouse Air Brake Technologies Corporation, Wilmerding, Pa.

[21] Appl. No.: 09/224,541

[22] Filed: Dec. 31, 1998

[51] Int. Cl.⁷ ................................................. H02M 7/00
[52] U.S. Cl. ............................................. 307/151; 307/149
[58] Field of Search ................................ 303/3, 15, 9.66, 303/122.15, 20; 307/149, 151

[56] References Cited

U.S. PATENT DOCUMENTS

| | | | |
|---|---|---|---|
| 4,105,189 | 8/1978 | Beall | 254/139 |
| 4,344,138 | 8/1982 | Frasier | 364/426 |
| 5,064,251 | 11/1991 | Romansky | 303/3 |
| 5,681,015 | 10/1997 | Kull | 246/187 |

*Primary Examiner*—Stephen W. Jackson
*Assistant Examiner*—Sharon Polk
*Attorney, Agent, or Firm*—Buchanan Ingersoll, P.C.

[57] ABSTRACT

An interface adaptor is provided between the locomotive MU cable and the ECP trainline permitting ECP data from the lead locomotive to be transmitted via the MU cable on trailing locomotives to a train of ECP cars. On the lead locomotive, the HEU Echelon interface is on a suitable line in the MU cable instead of the separate ECP trainline such the trailing locomotives do not require a separate ECP trainline. The adapter generally employs two transceivers configured as back-to-back repeaters to bridge ECP data between the locomotive MU cable and the ECP trainline. A DC—DC converter can be used to provide the ECP trainline voltage, either as 230 VDC or as a lower voltage. In lower voltage systems the converter may be replaced by a voltage regulator, or may be eliminated. In any case, an inductor is employed on the output to provide a high impedance to the overlay transceiver.

16 Claims, 4 Drawing Sheets

RAILWAY LOCOMOTIVE ECP TRAIN LINE CONTROL

BACKGROUND

The invention relates generally to Electrically Controlled Pneumatics ("ECP") freight train braking systems, and more particularly, to an adapter for connecting an ECP trainline, also called an "ECP" wire, to a standard locomotive Multiple Unit ("MU") cable such that one of the existing lines in the MU cable can be utilized to send ECP messages from a locomotive ECP Head-End-Unit ("HEU") through non-ECP equipped locomotives to a train of ECP freight cars. The HEU can also be part of a locomotive control unit ("CCU").

The American Railroad Association AAR has defined rail industry specifications for ECP braking systems based upon adding an ECP trainline cable to both cars and locomotives. The ECP trainline is basically a 2-wire cable which provides both electrical power (sourced from the locomotives) and data communications to each ECP car, employing the Echelon LonWorks powerline overlay system, using and Echelon transceiver model PLT-10.

Initial applications of ECP equipped cars are typically on unit trains, which can generally be maintained as a unit for ECP operation. In order to take full advantage of ECP operation, all locomotives used in the train must be equipped with at least the ECP trainline. Additionally, at least one of the locomotive consist must be equipped with the ECP 230 VDC power supply, and the lead locomotive must to equipped with an ECP HEU.

While unit train car sets can generally be dedicated to a given service, and maintained together, locomotives are often more difficult to keep dedicated to a particular train. For example, a heavy haul mineral train, which is one of the best suited for initial ECP applications, is typically pulled by 3 or 4 locomotives, all of which would be modified to support ECP operation according to AAR specifications.

Accordingly, there is a need for a system which can provide ECP operation in a train wherein only one locomotive sent as the lead locomotive in a consist is required to be ECP equipped. Such a system permits the utilization of non-ECP equipped locomotives in the consist and eliminates the need to immediately equip every locomotive with ECP equipment in a train employing multiple locomotives.

SUMMARY

According to the invention, an interface adapter is provided for connecting the locomotive MU cable to the ECP trainline such that ECP data from the lead locomotive ECP HEU is transmitted through the MU cable on trailing non-ECP equipped locomotives to the ECP trainline for the reception by the ECP cars. On the lead locomotive, the ECP HEU interfaces would be the same as for AAR specified ECP operation, except that the locomotive Echelon interface would be connected to a suitable line in the MU cable instead of the separate ECP trainline. Thus, trailing locomotives would require neither the separate ECP trainline nor ECP equipment.

An interface adapter is provided between the last non-ECP locomotive and the first ECP freight car. Generally, the adapter employs two Echelon transceivers configured as back-to-back repeaters to bridge ECP data between the locomotive MU cable and the ECP trainline. A DC—DC converter can be used to provide the ECP trainline voltage, either as the AAR standard of 230 VDC, or directly as a lower voltage related to low power ECP hardware options. If the ECP system can be operated at a lower power, such as 74 VDC, the DC—DC converter may be replaced by a voltage regulator, or may be eliminated. In this regard, two low power ECP operation systems are disclosed in commonly owned copending U.S. patent applications Ser. Nos. 09/224,540, titled RAILWAY EMULATION BRAKE and 09/224,543, titled ECP TRAIN LINE COMMUNICATIONS FOR RAILWAY FREIGHT CAR BRAKES, which were filed on Dec. 31, 1998, and which are hereby incorporated herein by reference.

In any case, whether either a DC—DC converter or a voltage regulator is used, an inductor can be provided on the output to provide a high impedance to the Echelon overlay transceiver (125 to 450 KHz carrier). The ECP data is transferred in both directions between the ECP trainline and the particular line in the MU cable used for ECP data transmission. The ECP/MU interface adapter can be carried either on the end of the last locomotive in the consist, or on the first ECP car. In the case of the 74 VDC option, the interface adapter could be compact enough to be packaged integral to the MU cable connector. Otherwise, the DC—DC converter for 230 VDC, and the AAR specified power rating (2,500 W) could be packaged in an easily portable unit for attachment to the last locomotive in the consist or to the first ECP freight car in the train.

Therefore, according to the invention, the need for ECP equipment on trailing locomotives can be eliminated and the hardware and cabling requirements for the locomotive consist can be minimized. Advantageously, the invention provides for the deployment of portable locomotive ECP HEU's, with wiring interfaces required only in the cab end of lead locomotives. As a result, the invention supports a gradual, more economically friendly transition period until all locomotives can be equipped with standard ECP equipment.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN EMBODIMENTS

Figure 1:
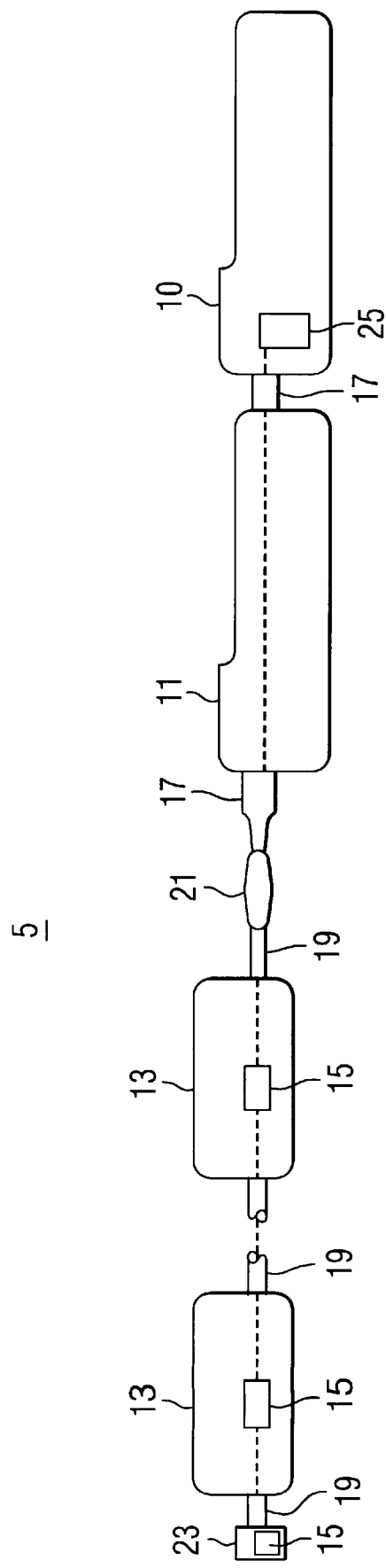
FIG. 1 is a schematic diagram of one embodiment of an ECP freight train according to the invention.

Referring now to the drawing figures wherein like reference numbers refer to similar parts throughout the several views, a presently preferred ECP train 5 is shown in FIG. 1, including a pair of locomotives 10, 11 and a number of ECP cars 13. Although only one lead locomotive and one trailing locomotive 11 are shown, more trailing locomotives 11 could be employed. Likewise, a typical such train 5 may have over one hundred ECP cars 13 and only two are shown simply for convenience and purposes of the description.

Each locomotive 10, 11 has an MU cable 17, which electrically joins the locomotives to each other and which, according to the invention, also joins the locomotives with the ECP trainline 19 via an interface adapter 21. The ECP trainline 19 interconnects each car 13 for transmitting data to and from the ECP equipment 15 on-board each car 13. According to the invention, an HEU 25 need be provided only on the lead locomotive 10. Typically, the train 5 may also include an end-of-train unit ("EOT") 23 which may also have ECP equipment 15 and could be connected to the ECP trainline 19. The EOT additionally typically includes radio frequency ("RF") communications ability for communicating thereby with the HEU 25 on the lead locomotive 10. It is to be understood that ECP equipment, such as used on the cars 13, including the HEU 25 on the lead locomotive 10, utilizes transceivers, e.g. Echelon transceivers, for RF communications.

Although shown in FIG. 1 as a separate unit The ECP/MU interface adapter 21 can be carried either on the end of the last trailing locomotive such as trailing locomotive 11, or the first car 13 of the train 5. The concept may be applied to either AAR specified 230 VDC ECP trainline cable operation, or an alternative low power ECP system, with 74 VDC power operation of the ECP cars. In the case of the low power option, the interface adapter 21 could be compact enough to be packaged integral to the MU cable connector. Otherwise, such as, for example, when the DC—DC converter is for 230 VDC for the AAR specified power rating (2,500 W), the interface adapter 21 could be in a portable unit attached to either the trailing locomotive 11 or the first ECP car 13 in the train 5.

The basic approach is to use the locomotive 10, 11 existing MU cable 17 as the means to send Echelon ECP data from the HEU 25 equipped lead locomotive 10 through the trailing, NON-ECP equipped, locomotive 11 to the ECP equipped cars 13. Due to low impedance, this is preferably not done directly via the locomotive battery line 28 as shown in FIG. 2. However, there are multiple alternative lines in the MU cable 17 which are candidates for this purpose. Based upon past research and applications of other products, the sand line 36, also called a "sander" or "sanding" line is a suitable line for this purpose. Moreover, the sand line 36 has already been qualified as suitable for application of power line overlay data communications, including in its energized state. It is to be understood however, that other lines in the MU cable 17 may also be suitable for such use and the invention is therefore not limited to the use of the sand line 36.

Figure 2A:
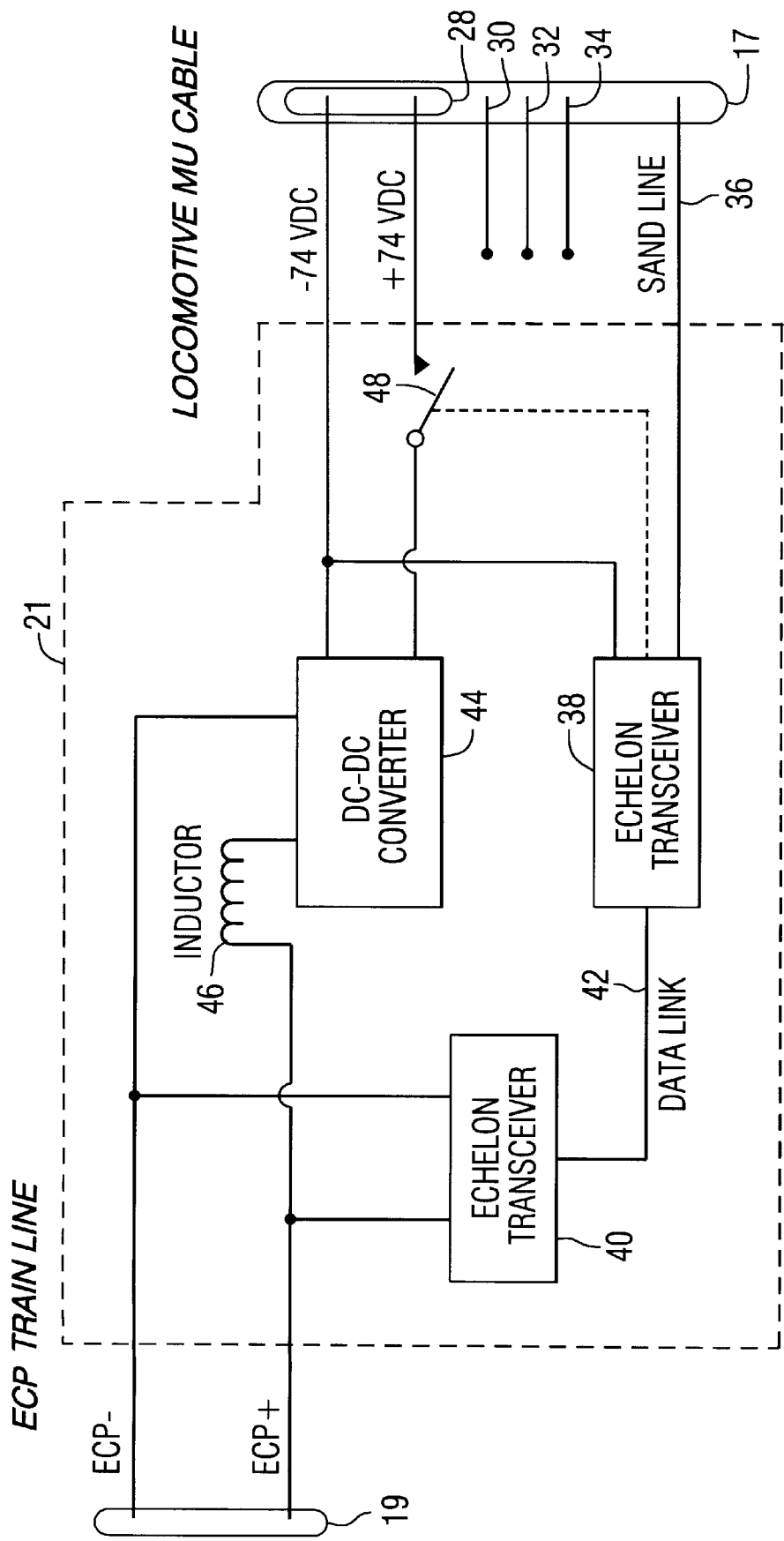
FIG. 2 is a schematic diagram of an embodiment of an MU cable-to-ECP wire interface adapter according to the invention.
Figure 2B:
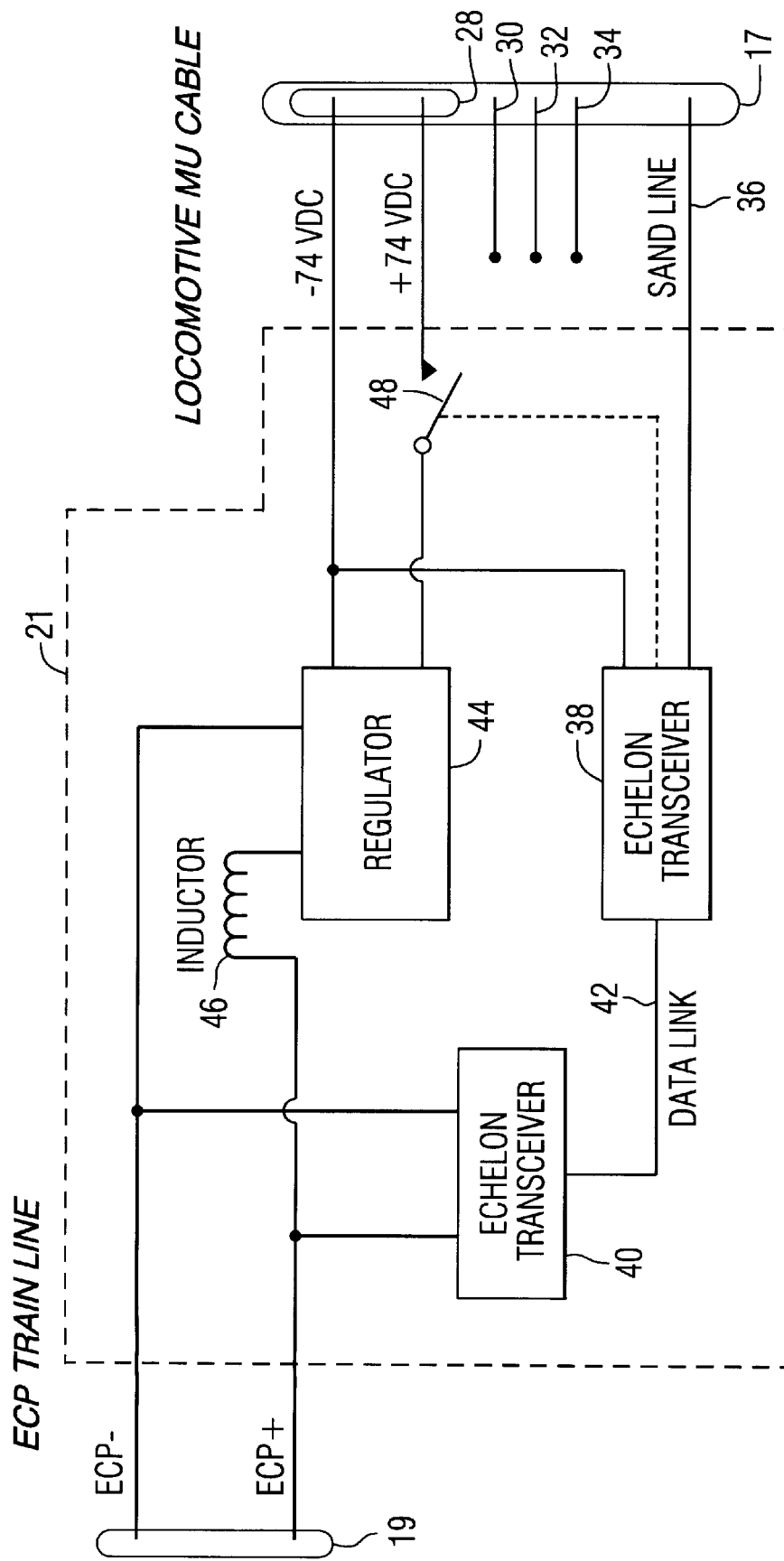

A presently preferred embodiment circuit for the interface adapter 21 can be as shown in FIGS. 2a, 2b. As shown, the MU cable 17 can include a number of lines 30–34, along A with the battery line 28 and the sand line 36. In the configuration shown, two Echelon transceivers 38, 40 are employed. The pair of transceivers 38, 40, are configured as back-to-back repeaters to bridge ECP data between the locomotive MU cable 17 and the ECP trainline 19 via the data link 42. The MU cable 17 Echelon transceiver 38 is powered from the MU side, and can also provide on/off power control to the ECP trainline 19 via a switch 48. A DC—DC converter 44 can provide the ECP trainline 19 voltage, as the AAR standard of 230 VDC, or other voltage level, including a lower voltage related to low power ECP hardware options, such as 74 VDC. If the ECP system can be operated from 74 VDC, the DC—DC converter (FIG. 2a) may be replaced with a voltage regulator (FIG. 2b), or may be eliminated altogether. In all cases, an inductor 46 may be provided on the output to provide a high impedance to the Echelon overlay transceiver (125 to 450 KHz carrier). Except for control of the ECP power, there is no processing or intelligence required in the DC—DC converter unit 44. ECP messages are transferred in both directions between the ECP trainline 19 and the sand line 36 on the MU cable 17.

Figure 3:
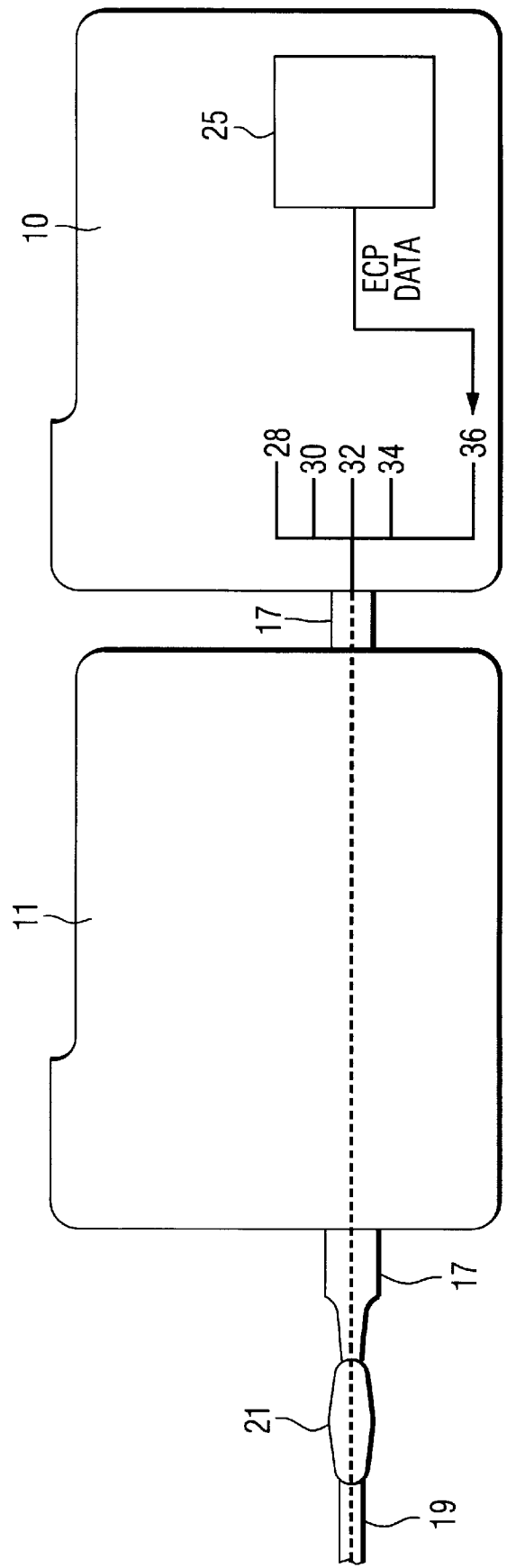
FIG. 3 is a schematic diagram illustrating how ECP data can be sent from an ECP locomotive through the MU cable.

According to the invention, only the lead locomotive 10 need be ECP equipped with an HEU 25. Moreover, the HEU 25 interfaces on the lead locomotive 10 would be the same as for AAR specified ECP operation, except that the lead locomotive 10 Echelon transceiver interface would be connected to a suitable line, such as the sand line 36, in the MU cable 17 instead of the separate ECP trainline 19. This is illustrated in FIG. 3, showing the HEU 25 connected to the sand line 36 for communicating ECP data thereby. Consequently, trailing locomotive 11 would not require the separate ECP trainline 19.

A significant advantage of the interface adapter 21 is that it provides for the operation of ECP trains 5 without requiring that the lead locomotive 10 and every trailing locomotive 11 be retrofitted with a separate ECP trainline 19, added ECP equipment 15 or HEU 25. This allows operation of the train 5 with no modifications on trailing locomotives 11 and requires minimal modifications to the lead locomotive 10. It should be understood that several trailing locomotives could be employed, and in that case only such trailing locomotives as are not ECP equipped would require the interface adapter 21 in order to bridge ECP data between the NON-ECP equipped trailing locomotive adn the ECP equipped locomotives and cars.

Further advantage is gained if this system is used in conjunction with a low power ECP system which is capable of operation from the 74 VDC trainline, such as referred to previously, regarding the two United States patent applications incorporated herein by reference. This would allow the interface adapter 21 to be packaged within an MU to ECP cable connector assembly, thus providing very easy portability. Another advantage is that the need for a locomotive installed ECP DC—DC converter can be eliminated.

It is to be understood that, while we refer to "74 VDC" or "230 VDC," this is a nominal voltage and this voltage can vary depending upon apparatus and operating conditions, including the distance of transmission along trains of varying lengths. It will also be apparent that other voltages could be satisfactorily employed.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. An interface adapter for operatively connecting a standard locomotive MU cable to a freight car ECP trainline wherein said MU cable has a battery line and at least one other line, said interface adapter comprising:
   a. a first transceiver communicating with said at least one other line; and
   b. a second transceiver communicating with said first transceiver and said ECP trainline for communicating data between said MU cable and said ECP trainline via said at least one other line.

2. The interface adapter of claim 1 further comprising an inductor electrically connected between said ECP trainline and said MU cable.

3. The interface adapter of claim 1 wherein said at least one other line comprises a sand line.

4. The interface adapter of claim 1 further comprising a DC—DC converter electrically connected between said ECP trainline and said battery line.

5. The interface adapter of claim 1 further comprising a voltage regulator electrically connected between said ECP trainline and said battery line.

6. The interface adapter of claim 1 further comprising a switch provided intermediate said ECP trainline and said battery line.

7. The interface adapter of claim 1 further comprising a third transceiver on a lead locomotive, said third transceiver communicating with a locomotive cab end of said at least one other line such that ECP data is transmitted from said lead locomotive via said at least one other line through said MU cable to said ECP trainline.

8. A method of interfacing an ECP equipped locomotive with an ECP trainline through at least one non-ECP equipped locomotive to ECP equipped freight cars, said ECP equipped locomotive and said at least one non-ECP equipped locomotive each having a locomotive MU cable, said method comprising:
   a. communicating ECP data between ECP equipment on said ECP equipped locomotive and said MU cable;
   b. communicating said ECP data through said at least one non-ECP equipped locomotive via said MU cable; and
   c. communicating said ECP data between said MU cable to said at least one ECP trainline on said ECP freight car.

9. The method of claim 8 wherein said MU cable comprises a battery line and at least one other line and said ECP data is communicated via said at least one other line.

10. The method of claim 9 wherein:
    a. said communicating comprises receiving said ECP data with a first transceiver, said first transceiver communicating with said at least one other line; and
    b. said transferring comprises transmitting said ECP data from said first transceiver to a second transceiver, said second transceiver communicating with said ECP trainline.

11. The method of claim 9 further comprising providing a high impedance between the ECP trainline and said at least one other line in said MU cable.

12. The method of claim 9 wherein said at least one other line is a sand line.

13. The method of claim 9 further comprising providing power to said ECP equipped freight cars using a DC—DC converter connected said battery line.

14. The method of claim 9 further comprising regulating voltage from said battery line to said ECP equipped freight cars.

15. The method of claim 9 further comprising selectively switching said battery line on and off.

16. The method of claim 10 wherein said transmitting ECP data over said MU cable via said at least one other line further comprises:
    a. interfacing a third transceiver on said ECP equipped locomotive with a locomotive cab end of said MU cable; and
    b. transmitting said ECP data via said third transceiver over said at least one other line.

* * * * *